United States Patent [19]
Taylor

[11] Patent Number: 6,152,998
[45] Date of Patent: Nov. 28, 2000

[54] AUTOMATIC FILTER CARTRIDGE

[75] Inventor: James Eric Taylor, El Centro, Calif.

[73] Assignee: Federal Air Conditioning Technologies, Inc., Calexico, Calif.

[21] Appl. No.: 09/264,915

[22] Filed: Mar. 9, 1999

[51] Int. Cl.⁷ .................................................. B01D 19/00
[52] U.S. Cl. .............................. 96/429; 96/424; 96/425; 73/863.51; 55/354
[58] Field of Search ............................. 96/424, 425, 429, 96/FOR 167, FOR 168; 73/863.51; 55/354

[56] References Cited

U.S. PATENT DOCUMENTS

| | | | |
|---|---|---|---|
| 2,782,612 | 2/1957 | Spiegelhalter | 96/429 |
| 3,175,775 | 3/1965 | Wurtenberg et al. | 96/429 |
| 3,286,443 | 11/1966 | Wooldridge et al. | 96/429 |
| 4,369,112 | 1/1983 | Vincent et al. | |
| 4,470,833 | 9/1984 | Wolfe | 96/429 |
| 4,494,406 | 1/1985 | Komons et al. | |
| 4,611,470 | 9/1986 | Enström | |
| 4,680,115 | 7/1987 | LaValley | |
| 5,791,408 | 8/1998 | Seem | |
| 5,955,682 | 9/1999 | Faircloth | 73/863.51 |

*Primary Examiner*—Duane Smith
*Assistant Examiner*—Minh-Chau T. Pham
*Attorney, Agent, or Firm*—Nydegger & Associates

[57] ABSTRACT

An automatic filter cartridge in accordance with the present invention includes a frame which is formed with an aperture and an elongated filter medium which is attached to a supply roller and a take-up roller. Specifically, the supply and take-up rollers are placed into respective supply and take-up containers which are mounted on the frame across the aperture. The frame is then positioned in the ducting of an air conditioning system to filter the airflow through the filter medium which extends across the aperture. To monitor the airflow through the ducting, the automatic filter cartridge can further include a computer. With this configuration, a sensor is positioned in the ducting to monitor the airflow through the ducting. When the sensor indicates the filter medium in the ducting is dirty, the computer activates a motor to rotate the take-up roller. As the take-up roller rotates, the dirty filter medium from the aperture is advanced and taken up in the take-up roller, and clean filter medium from the supply roller is advanced to cover the aperture.

17 Claims, 2 Drawing Sheets

U.S. Patent   Nov. 28, 2000   Sheet 1 of 2   6,152,998

AUTOMATIC FILTER CARTRIDGE

FIELD OF THE INVENTION

The present invention pertains generally to a filter for air ducting in an air conditioning system. More particularly, the present invention pertains to a filter cartridge for an air ducting which automatically replaces a dirty filter medium in the ducting with a clean filter medium. The present invention is particularly, but not exclusively, useful as an automatic filter cartridge system which measures airflow characteristics in the air ducting of an air conditioner and automatically changes a filter medium when the measurements of certain flow characteristics indicate the filter medium in the ducting is dirty.

BACKGROUND OF THE INVENTION

Air filter mediums are often installed in the ducting of air conditioning systems to remove dust and airborne particulates from the airflow. Over time these air filter mediums can become dirty and, as the filter mediums become dirty, the airflow through the ducting is impeded. If the airflow through the ducting is impeded to any significant extent, the consequence is that less cooled air can be delivered to the environment that is being cooled. In order to avoid this and maintain an efficient air conditioning system, dirty filter mediums in the ducting should be periodically replaced with clean filter mediums.

In some air conditioning systems, it is difficult to determine whether a filter medium is dirty and needs to be cleaned or replaced because the filter medium is positioned internally within the ducting and cannot be observed. Further, when replacing dirty filter mediums in the ducting with clean filter mediums, the air conditioning system may need to be stopped. While the air conditioning system is stopped, the environment which was being cooled by the air conditioning system will heat up. Once the air conditioning system is restarted, energy is wasted in returning the environment to the desired temperature. To maximize the efficiency of the air conditioning system, then, it is desirable to determine the cleanliness of the filter medium in the ducting and then replace a dirty filter medium without stopping the air conditioning system.

With the above in mind, it is an object of the present invention to provide an automatic filter cartridge for an air conditioning system to determine when a dirty filter medium is impeding the airflow through the ducting by monitoring certain characteristics of the airflow. It is another object of the present invention to provide an automatic filter cartridge for an air conditioning system which can replace the filter medium in the ducting without stopping the air conditioning system. Yet another object of the present invention is to provide an filter cartridge for an air conditioning system in which the replacement of dirty filter medium with clean filter medium can be easily accomplished. Another object of the invention is to provide a filter cartridge for a ducting of an air conditioning system, together with its method of operation, which is relatively easy to manufacture, simple to use, and comparatively cost effective.

SUMMARY OF THE PREFERRED EMBODIMENTS

An automatic filter cartridge for an air conditioning system in accordance with the present invention includes a frame and a filter medium which is mounted on the frame. With specific regard to the frame of the present invention, this component is generally rectangular and is formed with an aperture. Specifically, the aperture is sized and configured so that when the frame is positioned in the air ducting of the air conditioning system, the aperture is positioned to receive airflow through the aperture. Included with the frame are a supply container and a take-up container which are mounted on the frame on opposite sides and near the edges of the aperture.

With specific regard to the filter medium of the present invention, this component is an elongated strip which has one end attached to a supply roller and its other end attached to a take-up roller. The supply roller and take-up roller are placed in the respective supply and take-up containers on the frame. With this configuration, a portion of the elongated strip extends across the frame and covers the aperture of the frame. As intended by the present invention, when the automatic filter cartridge is positioned in an air conditioning unit, the airflow through the ducting will be filtered by the filter medium as the airflow passes through the aperture.

In order to provide an automatic capability for the filter cartridge of the present invention, a computer is included to analyze the airflow through the ducting to determine when the filter medium needs to be replaced. When a computer is used to analyze airflow characteristics in the ducting, the computer of the present invention preferably includes at least one airflow sensor which is in signal communication with the computer. For the present invention, the airflow sensor preferably measures either pressure or volumetric flow rate, or both, and generates a signal which is indicative of its measurement. This signal is then passed to the computer, where it is compared with a predetermined value that is based on the design airflow characteristics through the ducting and the geometry of the ducting where the first airflow sensor is located. Based on this comparison, a control signal is generated. Then, whenever the control signal indicates the filter medium across the aperture has become dirty, the take-up roller is rotated. As the take-up roller rotates, the filter medium advances across the frame and the portion of the dirty filter medium which has been positioned across the aperture is rolled up onto the take-up roller. As this happens, a clean portion of the filter medium strip from the supply roller is advanced to cover the aperture of the frame.

For another embodiment of the present invention, an additional sensor can be included which is also in signal communication with the computer. With this dual sensor configuration, one sensor is placed upstream from the filter medium while the other sensor is positioned in the air duct downstream from the filter medium. Thus, the two sensors are able to measure airflow characteristics before and after the airflow has passed through the filter medium. Again, both sensors preferably measure pressure or volumetric flow rate, or both, and generate signals which are based on the measured airflow characteristics. Once these upstream and downstream signals have been generated, they are then sent to the computer where they can be compared with predetermined values, or with each other, to generate a control signal. When the control signal indicates the filter across the aperture is dirty, a clean portion of the filter medium strip from the supply roller is advanced to cover the aperture of the frame, as similarly discussed above.

To advance the filter medium strip through the cartridge, the take-up roller must be rotated as discussed above. To do this, the cartridge of the present invention preferably includes a motor which is attached to the take-up container and which rotates the take-up roller. With this configuration, a control signal from the computer is sent to the motor. The motor is then activated to rotate the take-up roller. Alternatively, the take-up roller can be rotated manually. To do this, a handle can be attached to the take-up container to rotate the take-up roller, and the handle is then turned manually once a visual or audio signal from the computer indicates the filter across the aperture is dirty.

The control signal that is generated by the computer can also be used to selectively activate the motor to advance the strip of filter medium in the cartridge. Alternatively, a preselected time interval for generation of the control signal is possible. With this mode of operation, the control signal is generated to rotate the take-up roller and change the filter medium in the duct at a preselected time interval which is based on the operational history of the system. In the preferred embodiment of the invention, the amount the take-up roller rotates is preset to advance the strip of filter medium by a predetermined distance. In this manner, the strip of filter medium can be advanced to place clean filter medium across the aperture.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
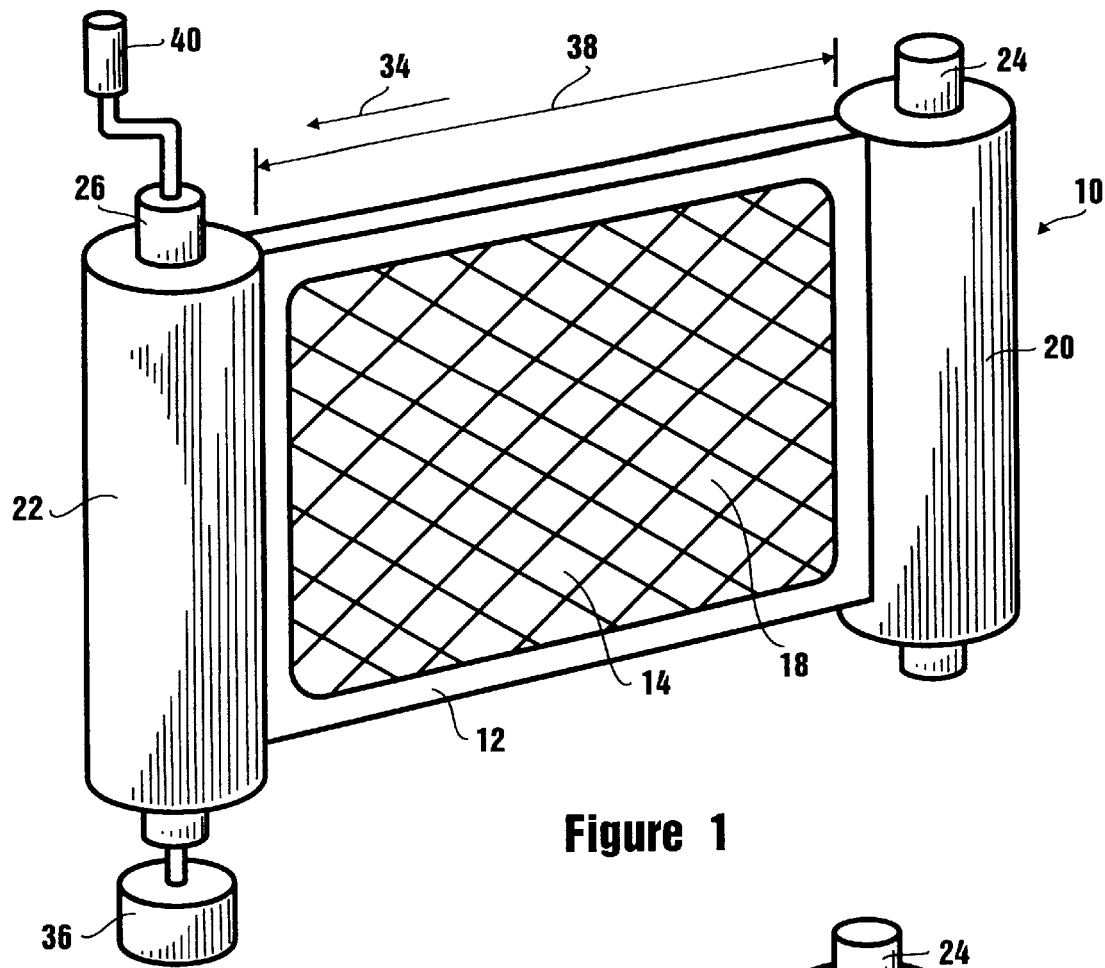
FIG. 1 is a perspective view of the automatic filter cartridge of the present invention with the filter medium extended across the aperture of the frame.
Figure 2:
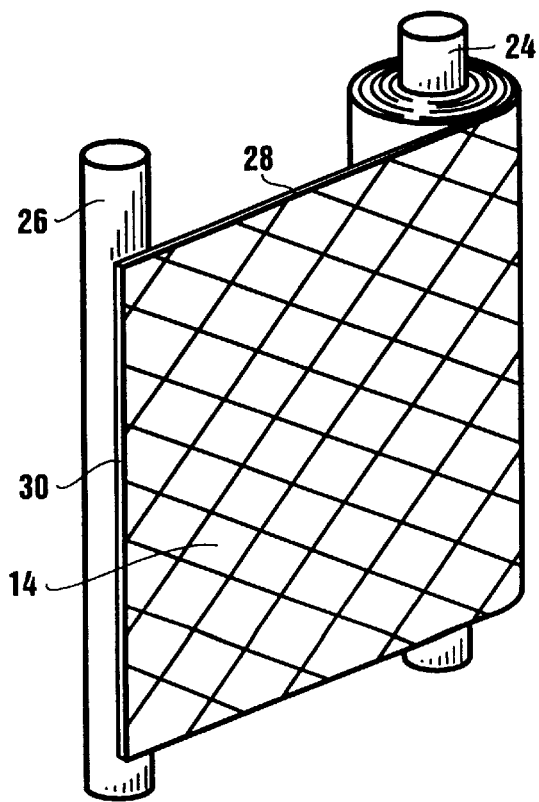
FIG. 2 is a perspective view of an elongated strip of filter medium of automatic filter cartridge of the present invention, with one end of the strip wrapped around the supply roller and with the other end of the strip attached to the take-up roller.

Referring initially to FIG. 1, an automatic filter cartridge in accordance with the present invention is shown and generally designated 10. As shown in FIG. 1, the cartridge 10 includes a frame 12 which is formed with an aperture 18 and a filter medium 14 which extends across the frame 12. Additionally, the frame 12 includes a supply container 20 and take-up container 22 which are mounted on the frame 12 opposite each other across the aperture 18. Referring briefly to FIG. 2, the filter medium 14 is shown in more detail as an elongated strip 28 made of a material well known in the pertinent art for air conditioning filtering purposes, preferably of filtering paper. In FIG. 2, one end (not shown) of the elongated strip 28 is attached to a supply roller 24. The strip 28 is then wrapped around the supply roller 24, and the other end 30 of the strip 28 is attached to a take-up roller 26. Referring back to FIG. 1, the respective supply and take-up rollers 24, 26 are placed in the respective supply and take-up containers 20, 22 of the cartridge 10. When the take-up roller 26 is rotated, the filter medium 14 which covers the aperture 18 will advance in the direction as shown by arrow 34 and be rolled up onto the take-up roller 26. Further, clean filter medium 14 will be advanced from the supply roller 24 to cover the aperture 18.

In order to rotate the take-up roller 26, and as shown in FIG. 1, a motor 36 can be attached to the take-up roller 26. When the motor 36 is activated, it rotates the attached take-up roller 26 to advance filter medium 14 from the supply roller 20 as described above. In an alternative embodiment of the invention, as also shown in FIG. 1, a handle 40 can be turned to advance the filter medium 14 as described above. To prevent the unnecessary expenditure of clean filter medium 14, in the preferred embodiment of the invention, the motor 36 is selectively activated to advance the filter medium 14 through a preselected distance to replace dirty filter medium 14 across the aperture 18 with clean filter medium 14 from the supply roller 24. More specifically, this preselected distance is substantially equal to the width 38 of the frame 12.

Figure 3:
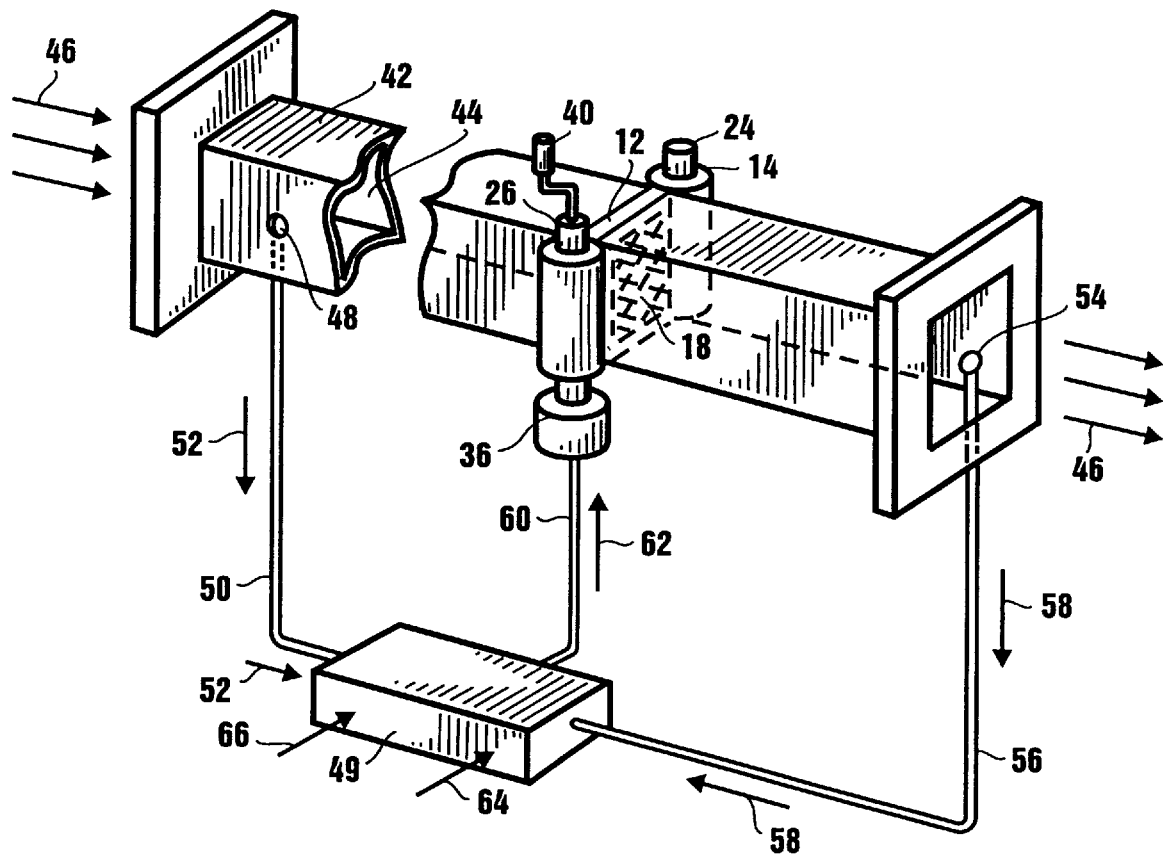
FIG. 3 is a perspective view of the automatic filter cartridge of the present invention with the frame operationally positioned in the ducting of an air conditioning system.

Referring now to FIG. 3, the automatic filter cartridge 10 of the present invention is shown in its operational environment. More specifically, the frame 12 is positioned in the ducting 42 of an air conditioning system. As the airflow passes through the opening 44 of the ducting 42 in the direction shown by arrows 46, it also passes through the aperture 18 of the frame 12 and is filtered by the filter medium 14 (shown in phantom). Eventually, the filter medium 14 becomes dirty or clogged and must be replaced with clean filter medium 14.

The airflow through the ducting 42 can be monitored to determine if the filter medium 14 is dirty. To do this, a first airflow sensor 48 (shown in phantom) is positioned to obtain measurements of certain airflow characteristics in the ducting 42, preferably air pressure or volumetric flow rate. This airflow sensor 48 is in signal communication with a computer 49 as shown by signal line 50. Based on these measurements, the airflow sensor 48 sends a first signal to the computer 49 as indicated by arrow 52. The computer 49 then compares the signal to a predetermined value. This predetermined value is based on the geometry of the ducting 42 where the sensor 48 is located and on the design airflow characteristics for the airflow through the ducting 42. Further, this predetermined value is representative of desired airflow characteristics through the ducting 42. Based on this comparison, an error signal is generated.

When the error signal which is generated by the computer 49 indicates the filter medium 14 is dirty or clogged, the computer 49 generates a control signal. The computer 49 is in signal communication with the motor 36 via signal line 60, and this generated control signal is sent from the computer 49 to the motor 36, as indicated by arrow 62. In response to the control signal, the motor 36 rotates the attached take-up roller 26. As the take-up roller 26 rotates, the dirty portion of the filter medium 14 which was across the aperture 18 is replaced with a clean portion of filter medium 14, as described above.

In another embodiment of the invention, and referring again to FIG. 3, the cartridge 10 includes a second airflow sensor 54. With this dual sensor configuration, the first airflow sensor 48 is positioned upstream of the filter medium 14 to obtain airflow characteristic measurements before the airflow has passed through the filter medium 14. Similarly, the second airflow sensor 54 is positioned downstream of the filter medium 14 to obtain airflow characteristic measurements after the airflow has passed through the filter medium 14. Like the first airflow sensor 48, the second airflow sensor 54 preferably measures air pressure or volumetric flow rate and is in signal communication with the computer 49 via outlet signal line 56.

Both the first and second airflow sensors 48, 54, can be any type sensor used in the prior art to obtain airflow measurements. One such sensor is described in U.S. patent application Ser. No. 08/969,070 by John E. Faircloth for an invention entitled "Portable Sensor Manifold For Air Conditioning Diagnostics" which is assigned to the same assignee as the present invention. Once the second airflow sensor 54 measures the airflow characteristics downstream of the filter medium 14, the second airflow sensor 54 sends an second air signal to the computer 49 as represented by arrow 58. The computer 49 then compares the first and second signals to each other, or to predetermined values, and generates a control signal. In response to the control signal, dirty filter medium 14 across the aperture 18 is replaced as discussed above.

In an alternative embodiment of the invention, the control signal can be selectively generated to activate the motor 36 to change the filter medium 14 in the ducting 42 independently of any sensor signals. More specifically, a time interval for generation of the control signal can be preselected and input into the computer 49 as represented by timed input arrow 64. When this embodiment of the invention is used, the preselected time interval is determined based on the operational history of the cartridge 10. In another embodiment of the invention, the control signal can also be selectively generated based on an input by a human system operator, as represented by manual input arrow 66.

In the operation of the automatic filter cartridge 10 of the present invention, the frame 12 and filter medium 14 are positioned in the air conditioning ducting 42 to receive the airflow through the aperture 18 of the frame 12. An airflow sensor 48 is positioned in the ducting 42 and obtains measurements of the airflow characteristics of airflow through the ducting 42. Based on these measurements, the airflow sensor 48 sends a signal to the computer 49. When a comparison of the signal to a predetermined value indicates the filter medium 14 across the aperture 18 is dirty, the computer 49 generates a control signal. In response to this control signal, the motor 36 rotates the attached take-up roller 26. As the take-up roller 26 rotates, the dirty filter medium 14 which covers the aperture 18 is advanced and taken up onto the take-up roller 26 and clean filter medium 14 is advanced from the supply roller 24 and positioned to cover the aperture 18.

While the particular Automatic Filter Cartridge as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A filter cartridge for removing dust and airborne particulates from an airflow that is flowing through a ducting of an air conditioning system which comprises:

a frame formed with an aperture, said frame being positioned in said ducting for receiving the airflow in said ducting through said aperture, said airflow having airflow characteristics;

a supply roller;

a first container fixedly mounted on said frame for holding said supply roller;

a take-up roller;

a second container fixedly mounted on said frame opposite said aperture from said first container for holding said take-up roller;

an elongated strip of filter medium having a first end attached to said supply roller and a second end attached to said take-up roller to extend said filter medium across said frame to cover said aperture;

a computer means for analyzing said airflow characteristics in said ducting to generate a control signal when said airflow characteristics indicate said filter medium in said aperture is dirty; and a means mounted on said second container for rotating said take-up roller in response to said control signal to advance said filter medium from said supply roller to said take-up roller.

2. A filter cartridge as recited in claim 1 wherein said filter medium is advanced by said rotating means through a distance in response to said control signal.

3. A filter cartridge as recited in claim 1 wherein said control signal is generated at a time interval and said time interval occurs before said computer means indicates said filter medium in said aperture is dirty.

4. A filter cartridge as recited in claim 1 wherein said computer means further comprises a first airflow sensor positioned in said ducting for obtaining a measurement of said airflow characteristics to generate a first signal indicative of said measurement, said computer means being in signal communication with said first airflow sensor for receiving said first signal, to compare said first signal with a value to generate said control signal for said rotating means.

5. A filter cartridge as recited in claim 4 wherein said first airflow sensor is positioned in said ducting upstream from said filter medium and said cartridge further comprises a second airflow sensor positioned in said ducting downstream from said filter medium for obtaining a measurement of said airflow characteristics after said airflow passes through said aperture to generate a second signal, said computer means being in signal communication with said second airflow sensor for receiving said second signal, to compare said first signal to said second signal to generate said control signal for said rotating means.

6. A filter cartridge as recited in claim 4 wherein said airflow characteristic to be measured is pressure.

7. A filter cartridge as recited in claim 4 wherein said airflow characteristic to be measured is volumetric flow.

8. A filter cartridge as recited in claim 1 wherein said control signal can be selectively generated to activate said rotating means.

9. Filter cartridge as recited in claim 1 wherein said rotating means is a motor.

10. A filter cartridge for removing dust and airborne particulates from an airflow having airflow characteristics that is flowing through a ducting of an air conditioning system which comprises:

an elongated strip of filter medium having a first end at a first location and a second end at a second location, a portion of said strip between said first location and said second location being positioned in said ducting for receiving said airflow therethrough until said strip in said ducting becomes dirty;

a computer means for analyzing said airflow in said ducting and for generating a control signal when said airflow characteristics indicate said portion of said strip in said ducting is dirty; and a means for advancing said strip from said first location to said second location in response to said control signal to replace said dirty portion of said strip in said ducting with a clean portion of said strip.

11. A filter cartridge as recited in claim 10 wherein said means for replacing said dirty portion of said strip further comprises:

a frame formed with an aperture, said frame being mounted in said air ducting for receiving said airflow through said aperture;

a supply roller, said first end of said strip being attached to said supply roller;

a first container fixedly mounted on said frame for holding said supply roller;

a take-up roller, said second end of said strip being attached to said take-up roller; and a second container fixedly mounted on said frame across said aperture opposite from said first container for holding said take-up roller to extend said portion of said strip in said ducting across said frame to cover said aperture, and wherein said advancing means rotates said take-up roller in response to said control signal from said computer means to advance said strip from said supply roller to place a clean portion of said strip across said aperture.

12. A filter cartridge as recited in claim 11 wherein said strip is advanced by said rotating means through a distance in response to said signal.

13. A filter cartridge as recited in claim 11 wherein said control signal is generated at a time interval and said time interval occurs before said computer means indicates said portion of said strip in said aperture is dirty.

14. A filter cartridge as recited in claim 11, further comprising a first airflow sensor positioned in said ducting for obtaining a measurement of said airflow characteristics to generate a first signal indicative of said measurement, said computer means being in signal communication with said first airflow sensor for receiving said first signal, to compare said first signal with a value to generate said control signal for said rotating means.

15. A filter cartridge as recited in claim 14 wherein said first airflow sensor is positioned in said ducting to measure said airflow characteristics before said airflow passes through said aperture, and further comprising a second airflow sensor positioned in said ducting downstream from said filter medium for obtaining a measurement of said airflow characteristics after said airflow passes through said aperture to generate a second signal, said computer means being in signal communication with said second airflow sensor for receiving said second signal, to compare said first signal to said second signal to generate said control signal for said rotating means.

16. A filter cartridge as recited in claim 11 wherein said rotating means is a motor, said motor being mounted on said second container.

17. A method for automatically changing a filter medium in an air ducting of an air conditioning system which comprises the steps of:

positioning an elongated strip of filter medium in said ducting for receiving an airflow having airflow characteristics therethrough, said strip having a first end and a second end and being extended across a frame having an aperture to cover said aperture, said frame having a first container fixedly mounted on said frame for holding a supply roller and a second container fixedly mounted on said frame for holding a take-up roller, said first and second ends of said strip being respectively attached to said supply roller and take-up roller;

monitoring said airflow characteristics with an airflow sensor, said airflow sensor being positioned in said ducting to obtain a measurement of said airflow characteristics as said airflow passes through said ducting, and to generate a signal indicative of said measurement;

evaluating said signal of said airflow characteristic measurement with a computer, to generate a control signal; and activating a motor to rotate said take-up roller in response to said control signal to advance said filter medium from said supply roller to place clean filter medium across said aperture whenever said control signal indicates there is a dirty filter medium in said ducting.

\* \* \* \* \*